United States Patent Office 3,503,496
Patented Mar. 31, 1970

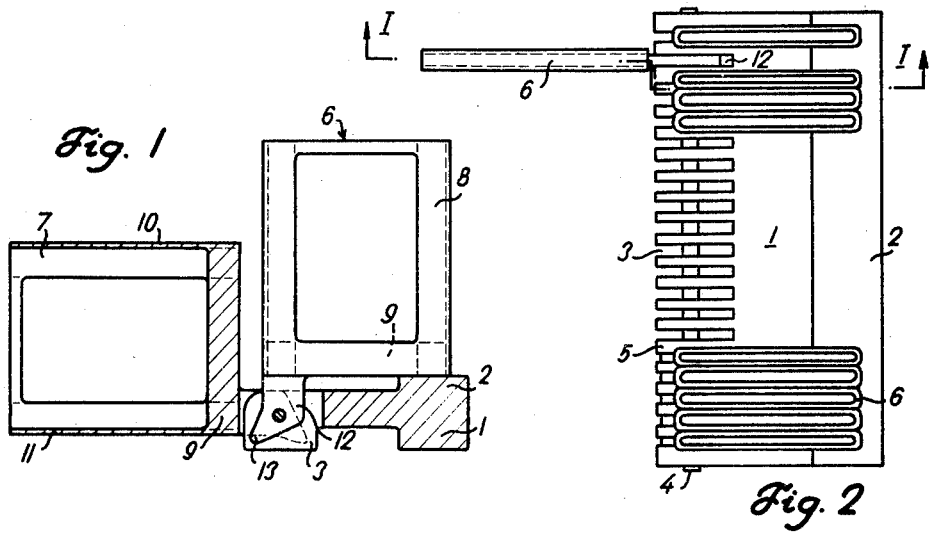
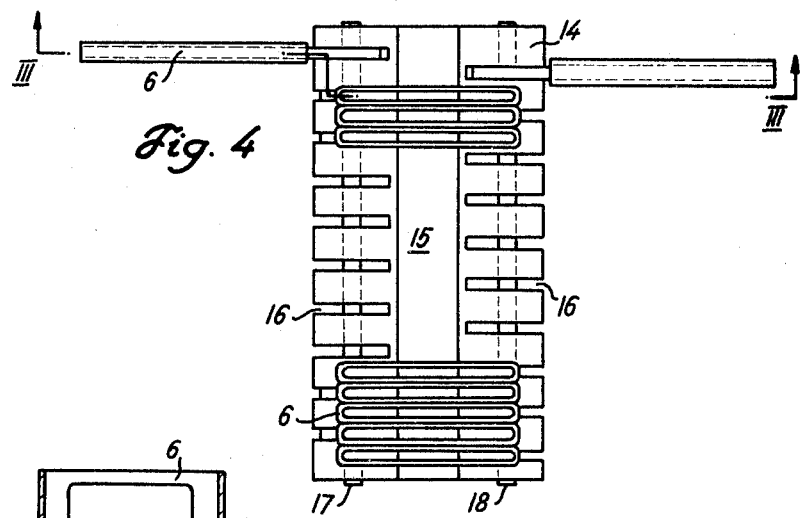
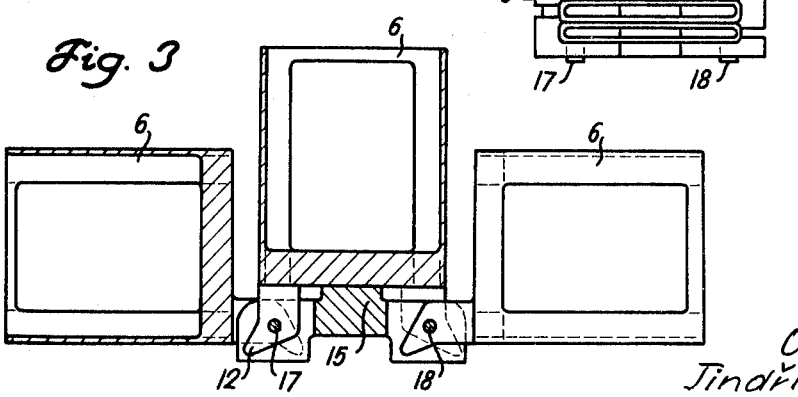

3,503,496
SLIDE MAGAZINE FOR A PHOTOGRAPHIC PROJECTOR
Alois Kovářík, Prague, and Jindřich Suchánek, Brno, Czechoslovakia, assignors to Meopta Narodni Podnik, Preror, Czechoslovakia
Filed May 31, 1967, Ser. No. 642,536
Int. Cl. G03b 23/02, 23/06; B65d 85/54
U.S. Cl. 206—62                    2 Claims

ABSTRACT OF THE DISCLOSURE

A slide magazine having frames for individual transparencies attached to a common carrier for pivoting movement about a common axis toward and away from an inoperative position in which the frames form a stack from which they may be swung individually into an operative position in the optical axis of the projector, thereby preventing the transparencies from being spilled accidentally from the magazine.

BACKGROUND OF THE INVENTION

This invention relates to photographic projectors, and particularly to a slide magazine for a projector. It will be discussed primarily with reference to an elongated magazine which is indexed longitudinally for sequentially presenting transparencies to the light beam of a projector lamp, but is not limited to such a type of magazine.

Conventional magazines are constructed in such a manner that the transparencies with their mounts are removed sequentially from the magazine, transferred into the optical axis of the projector, and thereafter returned to the magazine. The individual mounts are retained loosely in the magazine to permit their ready transfer. It is inherent in such an arrangement that the slides may be spilled from the magazine if the magazine is tilted accidentally, and have to be sorted prior to being returned to the magazine. The mounts, moreover, if slightly warped may jam during transfer from and to the magazine, and may be damaged and cause damage to the slide changing mechanism of the projector.

The invention aims at a slide magazine from which the individual transparencies and their mounts cannot readily be spilled, and which still permits transfer of the transparencies into and out of the optical axis of the projector with minimal danger of jamming.

SUMMARY OF THE INVENTION

The slide magazine of the invention, in its basic aspects, consists of a carrier on which thin frames adapted to hold transparencies with their mounts are secured for independent pivotal movement between respective inoperative and operative positions. When in the inoperative position, the frames are aligned in the direction of their thickness, and each frame moves pivotally about an axis which extends in this direction.

Other features, additional objects, and many of the attendant advantages of this invention will be readily appreciated as the same becomes better understood by reference to the following detailed description of preferred embodiments when considered in connection with the accompanying drawing.

BRIEF DESCRIPTION OF THE DRAWING

In the drawing:

FIG. 1 shows a slide magazine of the invention in front elevational section on the line I—I in FIG. 2;

FIG. 2 is a plan view of the magazine of FIG. 1;

FIG. 3 shows a modified magazine in front-elevational section on the line III—III in FIG. 4; and FIG. 4 shows the magazine of FIG. 3 in plan view.

DESCRIPTION OF THE PREFERRED EMBODIMENTS

Referring now to the drawing in detail, and initially to FIGS. 1 and 2, there is seen an elongated rectangular carrier plate 1 provided on its top with a broad rib 2 along one of its longitudinal edges, whereas the other longitudinal edge has twenty, uniformly spaced, transverse slots 3 which are open upwardly, downwardly, and toward one side. A pin 4 passes through the tooth-like integral portions 5 of the plate 1 which separate the slots 3, and through the slots themselves.

Twenty thin, rectangular frames 6, only partly shown in the drawing for the sake of clarity, are attached to the carrier plate 1 by the pin 4. Each frame has two apertured broad walls 7, 8 of sheet material which are connected along one narrow side of the frame by a base bar 9, and along the two long sides of the frame by thin side walls 10, 11. The fourth side of the frame opposite the bar 9 is open to permit insertion of a mounted 35 mm. transparency of conventional size and square shape, not itself shown. The transparency when inserted is exposed through the apertures in the walls 7, 8.

A lug 12, narrower than the remainder of the frame 6, projects from one end of the base bar 9 of each frame 6 into an associated slot 3, and the pin 4 passes in movable engagement through the several lugs 12 so that the individual frames 6 may be pivoted about the axis of the pin. The free end portion of the lug 12 tapers to a rounded point 13 which is offset from the pin 4 in a direction which defines an angle of about 45° with the direction of elongation of the frame as such.

In the normal, inoperative position of each frame, the end portion of the base bar 9 remote from the lug 12 abuttingly engages the rib 2 of the carrier 1. The center-to-center spacing of the slots 3 exceeds the thickness of one frame 6 by only a small amount not capable of pictorial representation on the scale of the attached drawing. When all frames 6 are in the inoperative position, they are aligned in a loosely packed stack from which they may be pivoted 90° into the optical axis of a projector, not itself shown.

While the frames 6 may be pivoted manually, it is preferred to provide the non-illustrated projector with a forked slide engageable with the lugs 12 for pivoting each frame 6 when the slide moves under the carrier 1 from the right to the left and vice versa, as viewed in FIGS. 1 and 2. The carrier 1 is normally supported on a suitable surface of the non-illustrated projector and is indexed longitudinally by a feed mechanism, not shown, in a conventional manner while all frames 6 are in the inoperative position. The mode of operation of the illustrated magazine is thus entirely conventional except for the pivotal movement of the frames 6 between the operative and inoperative positions.

FIGS. 3 and 4 show a magazine of the invention modified for use with a projector having two objectives for showing a series of transparencies without interruption by periods in which the projection screen is dark.

The carrier 14 illustrated in FIGS. 3 and 4 is provided with a rib 15 along the center of its top while both longitudinal edges are provided with ten slots 16 each. The spacing of the slots in each edge is twice that of the slots 3 in the carrier 1, and the slots 16 in one edge are offset by one half of a spacing from the slots in the other edge of the carrier 14. Frames 6 identical with those described above with reference to FIGS. 1 and 2 are normally arranged in a stack in two groups. The lugs 12 of one group extend into the slots 16 in one edge of the carrier 14, whereas the lugs 12 of the other groups extended into the slots 16 of the other edge. The lugs 12 of the two groups of frames are pivotally secured to pins 17, 18 extending over the length of the carrier 14 in the two rows of slots.

When the frames 6 on the carrier 14 are stacked in their inoperative position, the central portions of their base bars 9 abuttingly engage the rib 15. Alternating frames 6 of the stack swing 90° from the inoperative position in opposite directions into the two optical axes of the associated projector, not shown, and known in itself. One or two slides may be provided on the projector for swinging the frames 6 toward and away from their inoperative positions as described above if manual operation is not desired.

The frames 6 are spaced sufficiently in the direction of their thickness to permit individual frames to be swung out of the stack, yet the length of the stack is held to a minimum to conserve space. The spacing is maintained precisely by the engagement of each lug 12 with the walls of the associated slot 3, 16, but may be achieved differently. The replacement of individual slots by a wide open recess in the carrier 1, 14, and a corresponding broadening of the lugs 12 to the full thickness of the frame proper is specifically contemplated. In such an arrangement, the lugs axially abut against each other at all times and thus maintain proper spacing of the frames.

While the invention has been described with reference to a slide magazine in which the inoperative frames form a linear stack on a carrier moving in a straight line, pivotally mounted frames for individual transparencies may be arranged on a carrier which is angularly indexed about an axis of rotation for sequentially presenting the transparencies mounted thereon to a projector. In such a modified magazine, the individual frames are pivoted in respective planes which intersect each other in the axis of rotation of the carrier, and the several frames of the stack are angularly offset from each other.

It should be understood, therefore, that the foregoing disclosure relates only to preferred embodiments of the invention, and that it is intended to cover all changes and modifications of the examples of the invention chosen herein for the purpose of the disclosure which do not constitute departures from the scope and spirit of the invention set forth in the appended claims.

We claim:
1. A slide magazine for a photographic projector comprising, in combination:
   (a) a carrier;
   (b) a plurality of thin frames, each frame being adapted to hold a transparency;
   (c) mounting means securing said frames to said carrier for independent pivotal movement of each frame between an inoperative position and an operative position,
      (1) said frames, when in said inoperative position, being aligned in the direction of their thickness,
      (2) each frame moving about an axis extending in said direction between said positions thereof, said carrier being elongated in said direction and formed with a plurality of uniformly spaced slots in each of two opposite longitudinal edge portions, the slots in one edge portion being offset in said direction from the slots in the other edge portion, said frames constituting two groups of frames, the frames of one group alternating in said direction with frames of the other group in the inoperative position of the frames, each frame having a lug portion, the lug portions of each group extending into the slots in a respective edge portion of said carrier, and said mounting means including pivot pin means in each slot.

2. A magazine as set forth in claim 1, wherein the pivot pin means in the slots in each edge portion jointly constitute one continuous pin.

References Cited
UNITED STATES PATENTS

| | | | |
|---|---|---|---|
| 1,260,462 | 3/1918 | Schwanhausser | 353—103 |
| 1,990,019 | 2/1935 | Blackwood | 40—67 |
| 2,293,408 | 8/1942 | Schwanhausser | 40—81 X |
| 2,732,758 | 1/1956 | Waller | 40—79 X |

ROY D. FRAZIER, Primary Examiner

U.S. Cl. X.R.

40—67; 211—41, 169.1; 353—103